United States Patent Office 3,306,369
Patented Feb. 28, 1967

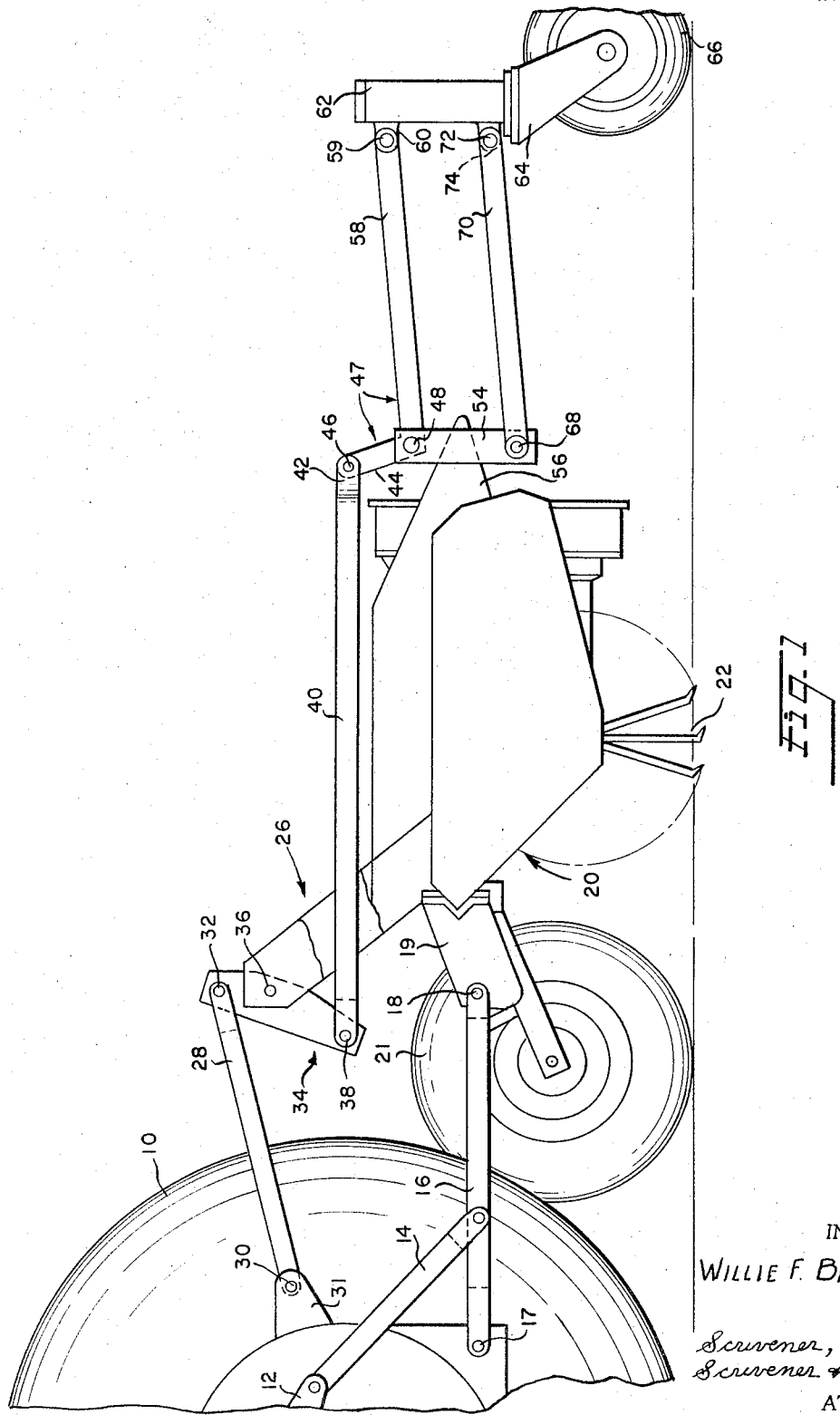

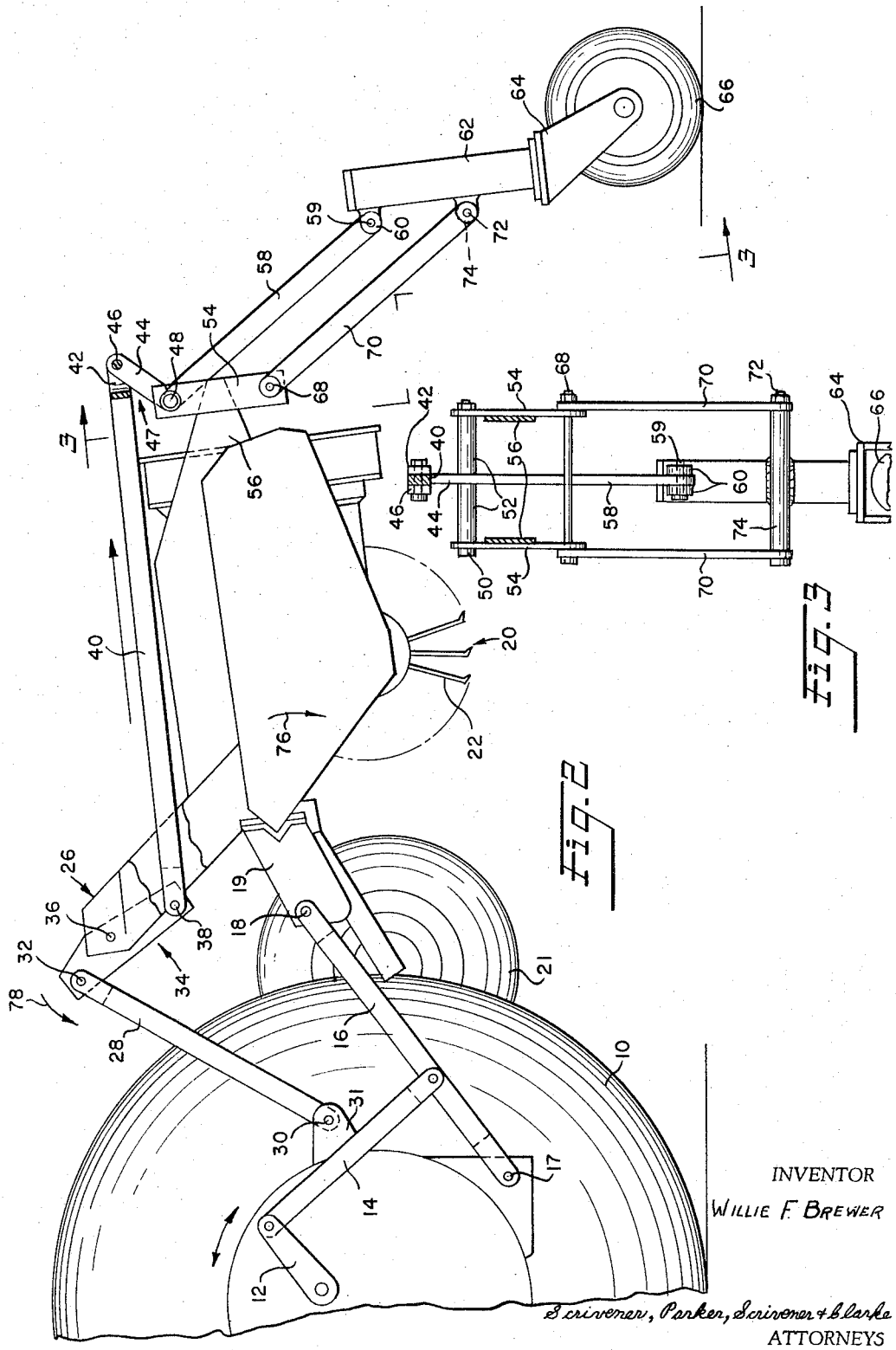

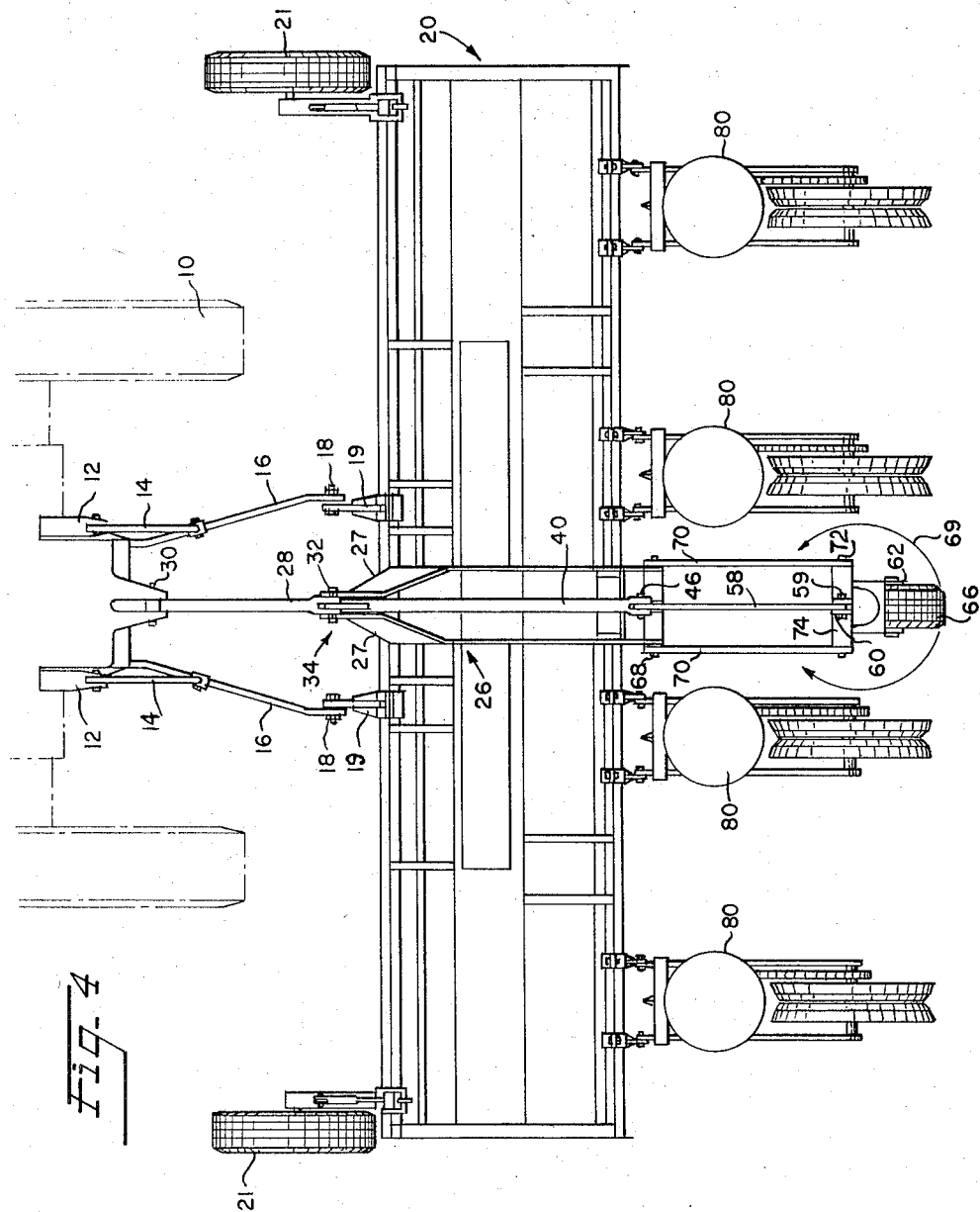

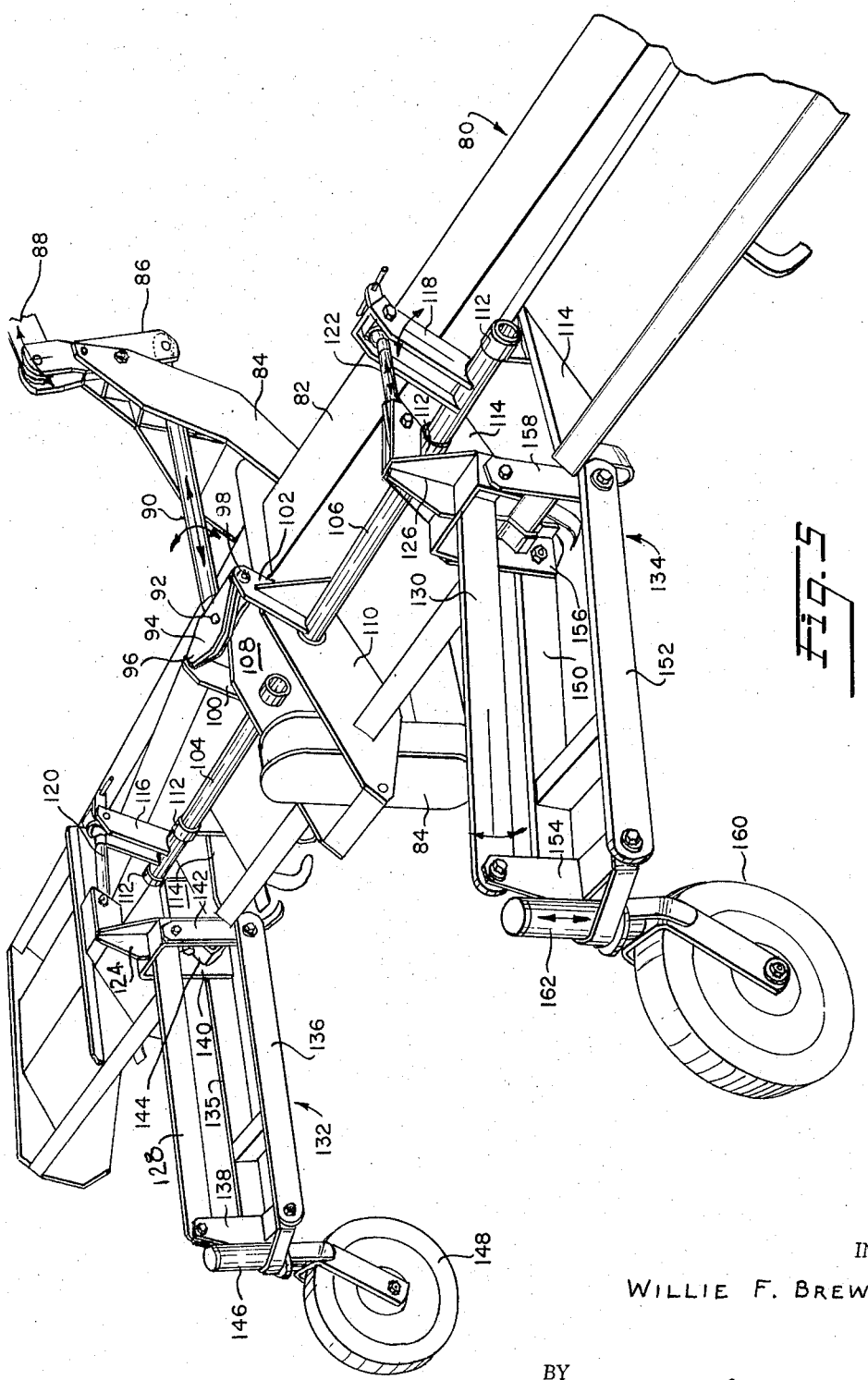

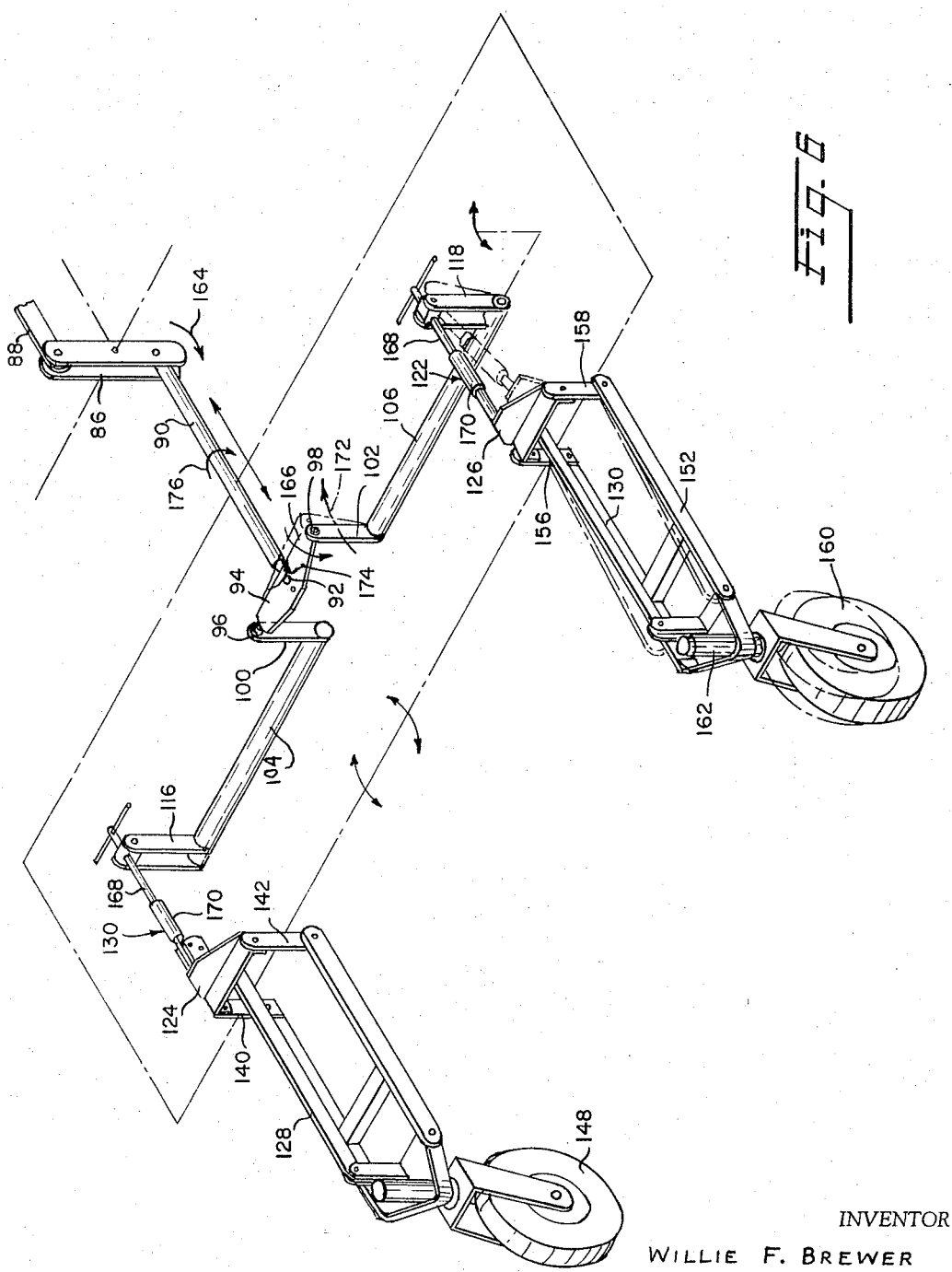

3,306,369
SUPPORT FOR IMPLEMENTS OR THE LIKE
Willie F. Brewer, Minden, La., assignor, by mesne assignments, to FMC Corporation, San Jose, Calif., a corporation of Delaware
Filed Nov. 2, 1964, Ser. No. 409,051
7 Claims. (Cl. 172—319)

This application is a continuation-in-part of my earlier application Serial No. 359,687, filed April 14, 1964, and now abandoned.

This invention relates to agricultural implements or the like and more particularly to improved transport and/or support means for equipment of the type adapted to be operably connected to a tractor by means of a three-point hitch.

The broad object of the present invention is to provide rolling support for the rear of an implement or the like of the type which is non-dirigibly connected to a tractor through the medium of lift mechanism of the three-point hitch variety.

More particularly it is an object of the invention to provide caster wheel support at the rear of an implement and an improved linkage arrangement for controlling the caster wheel, the linkage being constructed and arranged that the weight of the implement, irrespective of its vertical position with respect to the tractor, provides a reaction force which operates through the linkage to urge the wheel into supporting engagement with the ground.

Still another object of the invention is to provide plural caster wheel support for implements of substantial lateral dimension with the arrangement being such that the individual caster wheels cooperate with each other whereby each caster wheel is capable of limited independent reciprocatory movement in order to compensate for bumps or ground unevenness.

Other objects and their attendant advantages will become apparent as the following detailed description is read in conjunction with the accompanying drawings wherein:

FIG. 1 is a side elevation, partly in section, of a typical implement equipped with the caster wheel support of the invention;

FIG. 2 is a view similar to FIG. 1 but showing the implement in transport position;

FIG. 3 is a vertical cross-sectional view taken on the line 3—3 of FIG. 2;

FIG. 4 is a top plan view of the typical multi-purpose implement employing the support means of the invention;

FIG. 5 is a perspective view of an implement employing plural caster wheel support means embodying features of the invention; and FIG. 6 is a perspective view similar to FIG. 5 but showing more or less schematically the mode of operation of the arrangement of FIG. 5.

Referring now to FIGS. 1 and 2, the numeral 10 designates the rear wheel of a tractor which is provided with the usual three-point hitch arrangement including laterally spaced, hydraulically operated rocker arms 12, each of which is connected by a link 14 to the intermediate part of a power lift link 16 whose forward end is pivotally connected at 17 to the rear of the tractor and whose opposite end is connected by a pivot 18 to a suitable bracket 19 at the front of an implement, broadly designated by the numeral 20 and which may be the rotary plow shown. The plow 20 is provided with the usual depth control wheels 21 and radial tines 22 which are positively driven through suitable drive linkage means (omitted from the drawings for purposes of clarity) from the power take-off of the tractor. The three-point hitch also includes a mast 26 which, as may be seen in FIG. 4, is desirably constructed of two laterally spaced upwardly and forwardly sloping structural members 27 converging at the top and, in the conventional hitch, are intended to pivotally receive between their upper ends the rear end of a stabilizer bar 28 whose forward end is pivotally connected at 30 to a suitable bracket 31 attached to the rear of the tractor in vertically spaced relationship with respect to the axis of the pivots 17 of the lower or lift links 16.

As those skilled in the art will recognize, in a conventional three-point hitch when the implement is elevated to transport position by counter-clockwise movement in FIGS. 1 and 2 of the rock arms 12 to effect raising of the lift links 16 and hence the forward end of the implement, the stabilizer bar 28 prevents the implement from rotating counter clockwise rearwardly about the pivots 18 of the lower links 16. Though the conventional three-point hitch operates successfully, it will be apparent that the weight of a heavy implement exerts a force about the moment arm of the lift which, if the tractor is relatively light, effects a tendency of the forward end thereof to rise thus making steering difficult; at the same time the rear of the tractor is subjected to unusually high loading which causes early tire deterioration and excessive wear and tear of the structural parts of the tractor.

In accordance with the invention, the foregoing problems are eliminated through a novel linkage arrangement which cooperates with the three-point hitch to control a trailing caster wheel which serves to share a substantial proportion of the weight of the implement with the tractor. In the arrangement of the invention, instead of the outer or rear end of the stabilizer bar 28 being pivoted to the upper end of the mast 26, the end is pivoted at 32 to the upper end of a lever arm 34 which is pivoted intermediate its end by a pin 36 to the upper end of the mast in the position where the outer end of the stabilizing arm is usually received.

The lower end of the lever arm 34 is preferably longer than the upper end and is pivotally connected at 38 to the forward end of a link 40 whose rear end 42 is bifurcated to receive the outer end of an arm 44 which is pivotally connected to the end of link 40 by a pin 46. The arm 44 is part of a bell crank 47 pivotally received on a pin 50 provided with suitable spacers 52 (FIG. 3) and extending between a pair of laterally spaced, vertical bracket members 54 welded to the outer surface of rearwardly extending fin like members 56 rigidly connected to the rear of the implement.

The second arm of the bell crank 47 comprises an elongated bar 58 whose rear end is pivotally received on a pin 59 extending between a pair of spaced ears 60 welded to the outer surface of a cylindrical housing 62 rotatably receiving a vertical standard (not shown) extending upwardly from a bracket 64 supporting a caster wheel 66 which is free to swivel about the vertical axis of the housing 62 as indicated by the double ended arrow 69 in FIG. 4.

Spaced below the pivot pin 50 of bell crank 47 is a second pivot pin 68, which extends between the bracket members 54, as shown in FIG. 3, and pivotally carries the upper ends of a pair of links 70 whose lower ends are pivoted to a pin 72 received in a laterally extending tube 74 welded to the outer surface of the cylindrical caster wheel housing 62 in a position whereby the bell crank arm 58, links 70, the spacing between the upper pivot pins 48, 68 and the lower pivot pins 9, 72 of the arm 58 and links 70, respectively, define a parallelogram. When the bell crank 47 is rocked about its pin 48 in a clockwise direction the parallelogram and hence the caster wheel 66 is moved downwardly with respect to the implement 20 and when the bell crank is actuated in the opposite direction, the caster wheel is raised with respect to the implement.

In operation, first let it be noted that irrespective of the vertical position of the implement, it at all times tends to cantilever rearwardly or clockwise in FIGS. 1 and 2 about the pivot pins 18 at the outer or rear ends of the lift links 16. In accordance with the invention, this tendency is utilized to force the caster wheel 66 in the direction of the ground surface so that the caster wheel asumes at all times a substantial proportion, up to 50%, of the weight of the implement. The arrow 76 drawn in FIG. 2 about the axis of pivot pins 18 indicates the direction in which the implement would move were it not restrained by an opposing support operatively connected to the upper end of the mast 26. As the implement and the pivot pin 36 at the upper end of the mast tend to move in the direction of the arrow 76, the upper pivot 32, interconnecting the upper end of the lever 34 with the rear end of the stabilizer bar 28, tends to move in the same direction and to the same degree. However, because the stabilizer arm is inextensible it prevents the pin 32 and the upper end of the lever 34 from moving in a clockwise direction so that the lever arm 34 is caused to rotate counter-clockwise in the direction of the arrow 78. Upon this occurrence the lower end of the arm 34 and hence the link 40 are positively driven rearwardly to force the parallelogram linkage and hence the caster wheel 66 in the direction of the ground so that, in effect, the linkage and caster wheel can be said to jack up the rear of the implement at a rate which is coordinated with the elevating action of the rocker arms 12 and the lifting links 14 and 16, and regardless of whether the implement is in the elevated position of FIG. 2 or the working position of FIG. 1, the caster wheel at all times bears its proportionate share of the weight of the implement.

The linkage system of the invention has proved highly successful in actual practice and is particularly advantageous in that it permits smaller tractors to handle heavier implements and has permitted the use of additional tools which cooperates with the basic implement, as for example the seeders 80 shown in FIG. 4. In the absence of the present invention, it would be difficult if not impossible to lift the implement and the additional tools to transport position without danger of damage to the tractor or hitch components. It will also be apparent that when the implement is in working position with the depth gauge wheels 21 (see FIG. 1) in engagement with particularly bumpy ground so that the implement would tend to bounce, the arm 34 at the upper end of the mast is caused to rotate in one direction or the other so that the caster wheel 66 moves with the implement and serves to dampen or prevent any dangerous oscillatory movement of the implement. It should also be noted that the present invention can be employed with tractors having conventional three-point hitch arrangements without any modification whatever to the tractor carried parts.

The arrangement shown in FIGS. 5 and 6 is basically identical to the arrangement described above except that two laterally spaced caster wheels are employed rather than one in order to provide stabilized support for implements having substantial lateral width.

The implement illustrated in FIG. 5 is a rotary plow generally indicated by the numeral 80 and having a laterally extending frame 82 centrally supporting drive mechanism adapted to be connected in the usual fashion by universal joints and shafting (not shown) to the PTO shaft of the tractor. The front side of the frame 82 is provided centrally with the usual mast 84 of a three point hitch and centrally pivoted to the upper end of the mast is a lever 86 whose upper end is pivotally connected to the rear end of a link 88 whose forward end is connected to the tractor in substantially the same manner as the link 28 shown in FIGS. 1 and 2. The lower end of the lever 86 has pivoted thereto the forward end of a link 90, which corresponds, in part at least, to the link 40 in FIGS. 1 and 2, and whose rear end is pivotally connected by a pin 92 to the center of a yoke member 94 whose opposed ends are universally connected by ball and socket connections, generally indicated by the numerals 96, 98, to the upper ends of crank arms 100, 102 rigidly fixed adjacent the inner ends of respective lateral shafts 104, 106. The innermost ends of the shafts 104, 106 extend inwardly toward each other beyond the crank arms 100, 102 and are rotatably journaled as shown at 107 in support plates 108, 110 fixed to the implement frame.

The opposed outer ends of the shafts 104, 106 are journaled in suitable bearing members 112 fixed, as by welding or the like, to bracket members 114 with the respective ends having rigidly fixed thereto upstanding crank arms 116, 118 whose upper ends have pivotally connected thereto the forward ends of links 120, 122 whose rear end rear ends are pivotally connected to crank arms 124, 126 fixed in right angular relationship with the respective upper links 128, 130 of parallelogram linkages generally designated by the numerals 132, 134.

The linkage 132 is composed of the mentioned upper link 128, a pair of laterally spaced lower links 135, 136 having the same length as the link 128, a short rear link 138 and a pair of short forward links 140, 142 fixed to suitable brackets 144 and having the same dimension as the rear link 138. The upper and lower ends of the fixed forward links 140, 142 afford pivotal supports for the forward ends of the upper link 128 and the lower links 135, 136. The rear end of the linkage 132 rigidly carries a hollow vertical standard 146 for a caster wheel 148 which is universally rotatable about a vertical axis as well known in the art.

The linkage 134 is identical in all respects to the linkage 132 and includes lower link members 150, 152, a rear link 154, forward fixed links 156, 158, and a caster wheel 160 rotatably supported in a hollow standard 166 fixed to the rear of the linkage.

In operation and with particular reference to FIG. 6 it will be understood that when the implement is elevated by the power lift arms, not shown in FIG. 6 but corresponding to the arms 14 in FIG. 1 and 2, the lever arm 86 at the upper end of the mast 84 is caused to rotate clockwise in the direction of the arrow 164 moving link 90 rearwardly where it operates on the yoke 94 to move this rearwardly, thereby rotating the crank arms 100, 102 counter clockwise in FIG. 6 in the direction of the arrow 166 which in turn causes the arms 116, 118 to rotate in the same direction to cause the upper links 128, 130 of the parallelogram linkages 132, 134, through their respective crank arms 120, 126 to extend downwardly so that the caster wheels 148, 160 are positively driven in the direction of the ground to effect jacking or supporting action of the implement exactly as has been described in connection with the single wheel of FIGS. 1 and 4.

To insure that each of the caster wheels provide equal support, in accordance with the invention, the link arms 120, 122 affording connections between the outer crank arms 116, 118 and the respective parallelogram arms 124, 126 are constructed so as to be adjustable in length through the medium of threaded rod members 168 engaging threaded sleeves 170, the arrangement being such that should the operator observe that when the implement is on a level surface, one of the caster wheels is not receiving its proper share of the load, he would lengthen the appropriate link, say link 120, by turning the shaft 168 to force the caster wheel 148 further towards the surface until the load thereon is approximately equalized with the other wheel. This is usually indicated by right angular positioning of the yoke 94 with respect to shaft 90.

One of the particular features of the invention, illustrated in FIGS. 5 and 6, is that each of the caster wheels is susceptible of limited vertical movement with respect to the other without having any discernible effect upon the other wheel. That is to say, when one wheel encounters a bump, the wheel rides up and over the bump with respect to the implement without exerting any twisting action on the implement and without substantially affecting the second wheel, as by causing a downward movement of that wheel corresponding to the upward movement of the wheel encountering the bump.

With particular reference to FIG. 6, let it be assumed that the right hand caster wheel 160 encounters a rock so that in surmounting the rock the wheel will be elevated from the full line to the phantom line position. Upon this occurrence the upper link 130 of the parallel linkages causes the crank arm 126 to rotate clockwise thus moving the link 122 forwardly to effect clockwise rotation to the crank arms 118, 102 at opposite ends of the shaft 106. Now, as the crank arm 102 moves clockwise in the direction of the broken line arrow 172, the yoke 94, due to the ball and socket connection 98 of the arm 102 with the right hand end of the yoke causes the latter to rotate about the pivot pin 92 counter clockwise in the direction of the arrow 174 in FIG. 6. At the same time the yoke and link 90 rotate clockwise slightly about the axis of the link 90 in the direction of the arrow 176, there being sufficient looseness of fit of the forward end of the link 90 with the lower end of the lever arm 86 to permit such rotation. Under the foregoing conditions the left hand caster wheel remains substantially fixed in elevation with respect to the implement so that the left hand ball and socket connection 96 of the yoke 94 with the crank arm 100 serves substantially as a fixed fulcrum about which the yoke skews and the parts of the system move as the right hand caster wheel surmounts the bump. Obviously, the reverse action takes place when the left hand caster wheel encounters a bump and in either instance the operation is the same regardless of whether one wheel is elevated with respect to the other by a bump or a wheel is lowered with respect to the other by a depression in the ground.

It will be apparent to those skilled in the art that the invention is susceptible of a variety of modifications and changes without however departing from the scope and spirit of the appended claims.

What is claimed is:

1. Support means for an implement having a three-point hitch including a pair of laterally spaced hitch points on the front end of the implement and a mast having a hitch point at the upper end thereof, a lever arm pivoted intermediate its ends to the hitch point on said mast, a pair of laterally spaced parallelogram linkages connected to the rear of said implement and extending rearwardly therefrom, a caster wheel on the outer end of each of said linkages, a laterally extending yoke having its opposite ends operatively and universally pivotally connected to the respective parallelogram linkages, a link pivotally interconnecting the midpoint of said yoke with one end of said lever arm on said mast whereby rotation of said lever arm in opposite directions effects corresponding raising and lowering of said linkages with respect to said implement, and means on the opposite end of said lever arm adapted to pivotally receive the rear end of a stabilizer bar of a conventional three-point hitch.

2. Supporting means for an implement having a three-point hitch including a pair of laterally spaced hitch points on the front end of the implement and a third hitch point above and midway between said laterally spaced hitch points, a lever arm pivoted intermediate its ends at the third hitch point, said arm being movable in a vertical plane normal to a line interconnecting the laterally spaced hitch points, a pair of laterally spaced parallelogram linkages connected to the rear end of said implement and extending rearwardly therefrom, a caster wheel on the outer end of each of said linkages, crank arms rigidly connected to a movable member of the respective parallelogram linkages, each of said crank arms extending angularly away from said members, a laterally extending yoke having its opposite ends operatively and universally connected to the respective crank arms, a link pivotally interconnecting the midpoint of said yoke with one end of said lever arm at said third hitch point whereby rotation of said lever arm in opposite directions effects corresponding raising and lowering of said parallelogram linkages, and means at the opposite end of said lever arm adapted to pivotally receive the rear end of a stabilizer bar of a conventional three-point hitch.

3. The support means of claim 2 wherein said operable connection of said yoke with said parallelogram linkages include a pair of oppositely extending lateral crank shafts journaled on said implement, first and second inner and outer crank arms rigidly carried by the respective shafts, universal pivot means interconnecting the inner crank arms with the respective opposite ends of said yoke, and link means interconnecting the outer crank arms with the crank arms of the respective parallelogram linkages.

4. The support means of claim 3 wherein said last named link means are adjustable in length.

5. For use with a tractor having lift arm means and an upper stabilizer bar, a ground working implement having forward and rear ends, a mast and bracket means at the forward end of said implement, means for pivotally connecting said tractor lift arm means to said bracket means for moving said implement between working and transport positions, depth control wheel means carried at the forward end of said implement to engage the ground when said implement is in working position for predetermining the depth of ground penetration by said implement, a lever pivoted at a first point to said mast, arm means pivoted to the rear end of said implement for movement in a vertical plane with respect to said implement, a caster wheel pivotally connected to said arm means for engagement with the ground, rigid link means operatively connecting said arm means with said lever at a second pivot point spaced from said first point, and means for pivotally connecting said tractor stabilizer bar to said lever at a third pivot point, said lever being rotatable by said stabilizer bar to lower said caster wheel with respect to said implement when tractor lift arm means are actuated to raise said implement and vice versa whereby said caster wheel at all times aids in supporting said implement in both its working and transport positions, said implement and said depth control wheel being free of the ground when said implement is in transport position, the lever and link being constructed and arranged that when the lever is rocked by said stabilizer bar in response to changes in ground contour it causes said caster wheel, in cooperation with said depth control wheel means, to maintain a substantially constant predetermined working position of said implement with respect to the surface of the ground.

6. The combination of claim 5 wherein said arm means comprises a parallelogram linkage including vertically spaced parallel, rearwardly extending links whose forward ends are pivotally connected to vertically spaced points at the rear end of the implement and whose rear ends are pivotally connected at vertically spaced points to said caster wheel, the spacing between the first and second set of points being substantially equal, and a crank arm on one of said parallel links, said rigid link interconnecting said crank arm and said lever.

7. The combination of claim 5 wherein the first pivot point of said lever is intermediate the ends thereof and the second and third pivot points are disposed on said lever on opposite sides of said first pivot point.

(References on following page)

References Cited by the Examiner

UNITED STATES PATENTS 3,059,706   10/1962   Morkoski et al. _____ 172—445
3,087,557   4/1963    Hohstadt _____ 172—47 X
3,174,557   3/1965    Newkirk _____ 172—319

OTHER REFERENCES

German application 1,088,748, Clausing, September 1960.

ABRAHAM G. STONE, *Primary Examiner.*
WILLIAM A. SMITH III, *Examiner.*